United States Patent [19]
Hording et al.

[11] Patent Number: 5,695,614
[45] Date of Patent: Dec. 9, 1997

[54] METHOD FOR PROCESSING WASTE LIQUIDS IN PARTICULAR INDUSTRIAL WASTE WATER HAVING A HIGH SOLIDS CONTENT

[75] Inventors: Dieter Hording, Norderstedt; Claus Hellmann, Hamburg, both of Germany

[73] Assignee: Winter Umwelttechnik GmbH, Norderstedt, Germany

[21] Appl. No.: 499,644

[22] Filed: Jul. 7, 1995

Related U.S. Application Data

[63] Continuation of Ser. No. 132,564, Oct. 6, 1993, abandoned, which is a continuation-in-part of Ser. No. 853,980, Mar. 20, 1992, abandoned.

[30] Foreign Application Priority Data

Mar. 21, 1991 [DE] Germany .............................. 41 0927.6

[51] Int. Cl.$^6$ .................. B01D 1/18; B01D 3/00
[52] U.S. Cl. .................. 203/10; 34/86; 34/372; 34/469; 62/238.5; 159/4.04; 159/47.3; 159/48.1; 203/25; 203/27; 203/90; 203/DIG. 4; 203/DIG. 8
[58] Field of Search .................. 159/4.04, 4.1, 159/48.1, 47.3, 16.1, 24.2; 203/DIG. 4, DIG. 8, 10, 49, 90, 25, 27; 62/238.5, 183, 184; 202/236; 34/86, 469, 372, 31, 373, 468

[56] References Cited

U.S. PATENT DOCUMENTS

| | | | |
|---|---|---|---|
| 3,248,305 | 4/1966 | Williamson | 203/DIG. 4 |
| 3,311,543 | 3/1967 | Loebel | 203/DIG. 4 |
| 3,615,723 | 10/1971 | Meade | 159/4.1 |
| 3,637,465 | 1/1972 | Wilson | 203/DIG. 4 |
| 4,243,526 | 1/1981 | Ransmark | 203/49 |
| 4,478,686 | 10/1984 | Barth et al. | 203/49 |
| 4,704,805 | 11/1987 | Kaya et al. | 34/31 |
| 4,790,904 | 12/1988 | Yates | 203/49 |
| 4,915,792 | 4/1990 | Zeilon | 203/49 |
| 5,208,998 | 5/1993 | Oyler, Jr. | 159/4.01 |
| 5,252,187 | 10/1993 | Ohtsu et al. | 203/27 |

FOREIGN PATENT DOCUMENTS

| | | | |
|---|---|---|---|
| 2322101 | 3/1977 | France | 203/DIG. 4 |
| 2379482 | 10/1978 | France | 203/DIG. 4 |
| 0024930 | 12/1956 | Germany | 203/49 |
| 2334573 | 1/1975 | Germany | 203/DIG. 4 |
| 2453590 | 5/1975 | Germany | 203/49 |
| 2823570 | 12/1978 | Germany | 203/DIG. 4 |
| 2010104 | 6/1979 | Germany | 203/49 |
| 0009202 | 3/1984 | Japan | 203/DIG. 4 |
| 7804946 | 11/1979 | Netherlands | 203/49 |
| 0376288 | 6/1932 | United Kingdom | 159/4.01 |

Primary Examiner—Virginia Manoharan
Attorney, Agent, or Firm—Emrich & Dithmar

[57] ABSTRACT

A method for processing waste liquids, having high solids content. The process includes the steps of spraying and evaporating the waste liquid together with a dry gas in a counterflow of dry gas within a spray tower, collecting the solids of the waste water in a lower section of the spray tower, discharging the moist gas from an upper section of the spray tower, and bringing the moist gas in heat exchange with an evaporator of a refrigerating means to condensed the liquid from the evaporator. The cooled dry gas is directed in heat exchange with the condenser of said refrigerating means and heated to be returned in a closed loop to repeat the cycle of operation.

3 Claims, 1 Drawing Sheet

METHOD FOR PROCESSING WASTE LIQUIDS IN PARTICULAR INDUSTRIAL WASTE WATER HAVING A HIGH SOLIDS CONTENT

The present application is a continuation application of U.S. Ser. No. 08/132,564 filed Oct. 6, 1993, abandoned which in turn is a Continuation-In-Part application of U.S. Ser. No. 07/853,980 filed Mar. 20, 1992, which is now abandoned.

BACKGROUND OF THE INVENTION

The present invention relates to a method and apparatus for processing waste liquids and, in particular, industrial waste water having a high solids content.

A number of processes exists for treating waste water and industrial waste waters. These processes include separating inorganic and organic components from the water and recovering products contained therein. Generally, the separation of water in the processes is performed in a plurality of ways either chemically, biologically or by a combination of various methods. However, serious drawbacks arise from adding chemicals to the water or, from high the energy costs associated with such recovery systems. The processing of chemically loaded industrial waste waters, such as, electroplating waste waters, and the depositing of concentrated slurries requires large investments and the use of excessively expensive systems. Thus, the processing of waste water such that it may be returned to the public waste disposal system is rather expensive and time consuming. Also, the processing of the slurries resulting from such processing involves serious problems in handling and costs of production because the concentration of the slurries requires a high energy consumption. Such problems has limited their commercial acceptance.

SUMMARY OF INVENTION

It is the object of the present invention to provide an energy saving method and apparatus for processing waste liquids, in particular industrial waste water, having a high solids content in which the solids of the liquid are recovered as dry concentrate and the water is recovered in a clean condition, thereby eliminating pollution of the environment.

According to the present invention, the objects are solved by a novel method, wherein industrial waste water is treated in a closed system by spraying and evaporating the waste liquid in a spray tower by directing dry air in a counterflow to the sprayed waste liquid. The solids in the waste liquid are collected in a lower section of the spray tower. The moist air or gas is discharged from an upper section or the spray tower and directed to a refrigeration means wherein the moist air is condensed and purified water is collected and obtained. The cooled dry air is heated and recycled in the spray tower to repeat the cycle of operation.

Specifically, in the present invention, a spray tower is provided to permit spraying the waste water in a counterflow of dry gas, preferably, dry air. Spray towers for making granulate materials are known in the art. For example, for drying foods or pharmaceutical products it is known to transmit warm (hot) air through the whirled bed of the product which air is circulated and dried and recycled (German Patent 27 07 065). A similar method is known from (German application 27 43 724) for spray drying perishable liquid products such as skimmed milk and whey for making powdered milk. In contradistinction to the spray drying process in which the water is normally evaporated at high or elevated temperatures, the present invention uses the mere vaporization of the water sprayed in the spray tower.

In the present invention, the moist gas is brought in heat exchange with the evaporator of a refrigerator. Accordingly, the gas is cooled and the moisture is condensed and collected. The collected water has a high grade of purity exceeding that of deionized water and discharge of the purified water into a water system for supplying industrial plants is thus easily possible. Indeed, discharging the purified collected water into a public disposal system involves little or no risk.

The condensing heat of the evaporator results in a heating of the refrigerant, which in turn heats the condenser of the refrigerator. The dry dehumified air coming in heat exchange with the condenser becomes heated. In other words, the heat energy (condensing heat) recovered from the moist gas stream in the dehumidifying step is returned to the gas stream to heat the same. The dry, slightly heated air is then again delivered to the spray tower. A portion of the heated dry air is delivered to the spray tower to facilitate spraying the waste water and further portion of the heated dry air is directed to provide a counterflow with respect to the sprayed water stream.

Because there is no loss of energy in the cycled gas, the energy for maintaining the gas cycle as well as for driving the motor of the refrigerator and spraying the waste water in the spray tower must be supplied from outside. The method of the present invention thus provides a high efficiency and economy.

The recovered water has a high quality. The recovered water is free of algae or organic substances and substantially has the quality of distilled water. The solids are recovered as a powder-like concentrate and may be readily recycled. As the concentrate is dried, its volume is at a minimum.

The method according to the present invention does not require chemicals and because the process is performed in a closed system, there is no pollution of the environment.

Additionally, the circulation of the gas or air stream within the system requires mechanical energy which is connected to heat energy in the circuit system so that under certain circumstances an excess of heat results which can be used in a further embodiment of the invention to heat the waste water before being sprayed and cycled through the system.

Industrial plants often produce acid and alkaline waste waters. A substantial advantage of the present invention is provided by the fact that a separate processing of the waste water prior to processing is not required. Here, the various types of waste water liquids can be mixed together and then sprayed in the system. According to one embodiment of the invention, the sprayed waste water preferably has a pH value of 7 to 9, that is, it is slightly alkaline.

An apparatus for performing the method according to the invention comprises two basic components, a spray tower and a refrigerator means. The spray tower comprises a spraying means in an upper section thereof to be connected to a waste water reservoir. A motor-driven pump is provided in the waste water line to the spraying means. It should be understood that it is within the scope of the present invention that the liquid may be atomized or mixed by means of ultrasonic energy or the like. The refrigerator means, preferably a compressor refrigerating machine, conventionally comprises an evaporator and a condenser which are used as a heat exchanger for the gas or air in the apparatus of the present invention. The gas or air is circulated in a closed loop through the spray tower to vaporize the sprayed liquid and to separate the moisture as a condensate. As set forth above, the combination of a spray tower and a refrigerator means results in an extremely energy saving method and apparatus, while at the same time providing optimum results in processing the liquid such as, polluted water, under conditions which are not harmful to the environment. The dimensions of an apparatus according to the present invention are compact so that it lends itself to be integrated in existing plants. The costs for manufacturing the apparatus according to the invention as well as for operation are extremely low and economical.

BRIEF DESCRIPTION OF THE DRAWINGS

A preferred embodiment of the present invention will now be described, by way of example, with reference to the accompanying drawings.

DETAILED DESCRIPTION OF THE INVENTION

Figure 1:
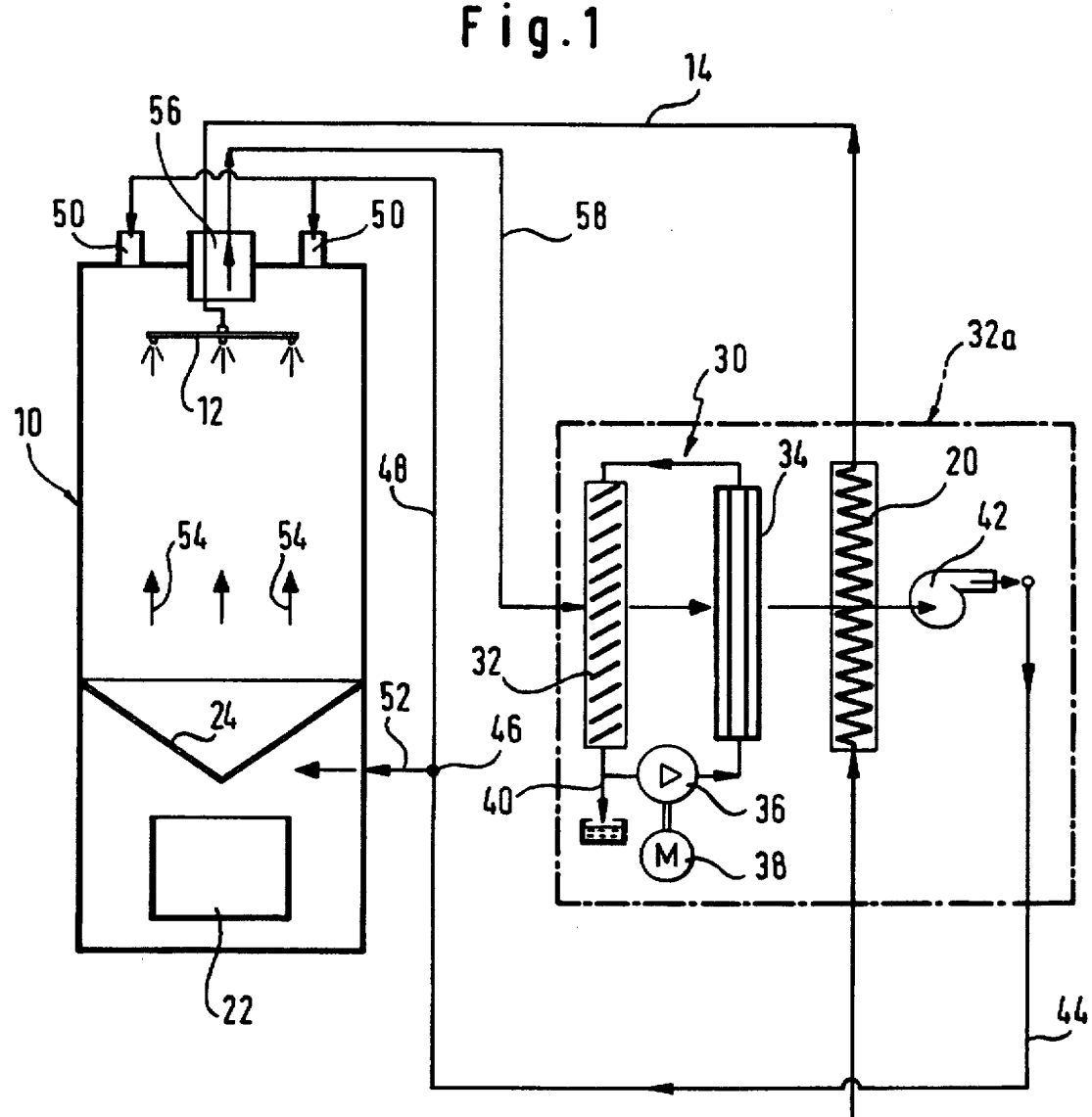
FIG. 1 schematically shows an apparatus according to the present invention.
Figure 2:
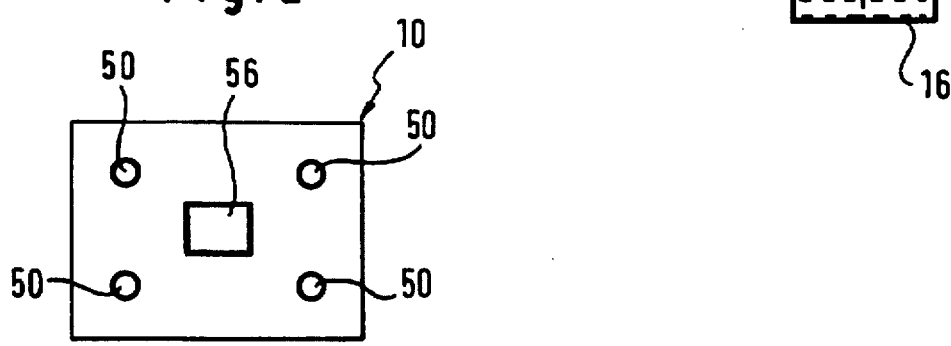
FIG. 2 shows a view of a spray tower according to FIG. 1.

The drawings shows a spray tower 10 having an upper section or portion in which a spraying means 12 is provided which is connected through a line 14 to a waste water reservoir 16. A pump 18 and a heat exchanger 20 are provided in the line 14.

The lower section or portion of the spray tower 10 accommodates a collecting means 22 for a concentrate of the dried solids. Above the collecting means 22 there is a conical sieve 24.

A refrigerator means generally designated 30 comprises an evaporator 32 of a finned structure and a condenser 34 defined by a fall-pipe or bare tube or tubular evaporator. The refrigerator 30 is located in a closed compartment, as indicated in dash-dotted lines 32a. The refrigerator means 30 further comprises a compressor 36 which is driven by a motor 38. The evaporator 32 includes a condensate drain 40. The compartment 32a housing the heat exchanger 20 further includes a radial fan 42, the outlet thereof which communicates with a pipe or line 44 leading to a branching-off or junction 46. A branch line 48 communicates with the junction 46 leads to the top of the spray tower 10 and opens into four inlet openings 50. The second branch line 52 communicates with the junction 46 and opens into the spray tower 10 in the lower section thereof below the conical sieve 24.

The operation of the apparatus is as follows. Waste water pumped from the reservoir 16 is sprayed in the spray tower by the spraying means 12 which is introduced together with dry air from the branch line 48. The "spray stream", having a particle size of between about 20 to 30 micron (μ), flows downwardly in a countercurrent of dry air which is introduced through the branch line 52. Preferably, the size of particles being sprayed is about 25μ, with the sprayed waste liquid preferably having a temperature of between about 15°–18° C.; that is, room temperature. The flow of the countercurrent of dry air is indicated by the arrows 54 within the tower 10. It should be understood that proper provisions are made to obtain an intimate and uniform contact of the airstream 54 and the spray flow. The dry air introduced via the lines 52 and 48 initially has a temperature of 15° to 18° C., for example (room temperature). Preferably, the dry air further contains a moisture of 1 g/m³. The dry air is loaded with moisture and leaves the spray tower through an upper central opening 56 in the top lid of the spray tower 10 and is supplied through a line 58 to the refrigerator means 30. The moist air leaving the tower 10 has a moisture of 24 g/m³, for example, and is circulated in heat exchange over the evaporator 32 of the refrigerator means 30. The moist air is cooled thereby resulting in a condensation of the Water which is collected in a reservoir 40. The cooled dry air again having a moisture content of about 1 g/m3 is then directed to the condenser 34 of the refrigerator means 30 and is heated there as the evaporator 32 causes a heating of the refrigerant by its condensating heat which is transmitted to the dried cool air by a heat exchange process in the condenser 34. The dry air leaves the heat exchanger 34 having a temperature of approximately 45° C. This heat is partly given off in the heat exchanger 20 to heat up the waste water in the line 14 that is directed from the reservoir to the tower to repeat the cycle of operation. The heated dry air is then delivered through the line 44 to the spray tower 10 as described before.

As one skilled in the art realizes, the air stream is circulated in a closed system which is not harmful to the environment. By adjusting the pressure as well as by controlling the extent of heating of the waste water, the temperature within the system can be controlled. When the heat exchanger 20 is eliminated, a relatively high temperature of the dry air may be obtained because the mechanical energy for driving the fan 42 is converted to heat energy. However, heating the waste water facilitates the vaporization of the sprayed water so that a total energy balance is obtained which results in an extremely high efficiency of approximately 85% of the system according to the present invention.

The system may be used for processing electroplating waste water, for example. The waste water is preferably adjusted to be slightly alkaline. In such an instance, acid and alkaline waters may be processed in common and together. Generally, a plurality of various liquids may be processed according to the present invention, to recover and purify electrolyte solutions.

I claim:

1. A method for processing a waste liquid having a solids content within a spray tower having an upper section and a lower section, consisting essentially of the steps of:

a) spray evaporating the waste liquid having the solids content together with a dry gas in a counterflow of said dry gas in the spray tower to transfer moisture from the waste liquid to said dry gas to provide a moist gas, with the sprayed waste liquid having a temperature of between about 15° to 18° and the solids therein having a particle size of between about 20 to 30 microns, b) collecting the solids from the waste liquid in the lower section of the spray tower, c) discharging said moist gas from the upper section of the spray tower and bringing the discharged moist gas in heat exchange with an evaporator of a refrigerating means, wherein a purified liquid condensed by the evaporator is separated from said moist gas and said gas is cooled, to provide a cooled dry gas;

d) bringing said cooled dry gas in heat exchange with a condenser of said refrigerating means to heat said dry gas to provide a heated dry gas, and e) returning said heated dry gas in a closed loop to the spray tower to repeat the method of processing the waste liquid having the solids content.

2. The method of claim 1 further consisting of the step of bringing the waste liquid having the solids content into heat contact with at least a portion of said heated dry gas discharging from the condenser of the refrigerating means before the spraying and evaporating step.

3. The method of claim 1 wherein said particle size of the solids in the sprayed waste liquid is about 25 microns.

* * * * *